(12) United States Patent
Tecson et al.

(10) Patent No.: US 9,739,408 B2
(45) Date of Patent: Aug. 22, 2017

(54) NOISE ATTENUATION APPARATUS FOR FLUID DEVICES

(71) Applicant: Emerson Process Management Regulator Technologies, Inc., McKinney, TX (US)

(72) Inventors: Joshua Logan Tecson, Bedford, TX (US); Tung K. Nguyen, McKinney, TX (US); Juan Manuel Diaz, Melissa, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/997,052

(22) Filed: Jan. 15, 2016

(65) Prior Publication Data

US 2017/0205015 A1 Jul. 20, 2017

(51) Int. Cl.
*F16L 55/02* (2006.01)
*G10K 11/16* (2006.01)
*F16L 55/027* (2006.01)

(52) U.S. Cl.
CPC ...... *F16L 55/02718* (2013.01); *G10K 11/161* (2013.01)

(58) Field of Classification Search
CPC ................. F16L 55/02718; G10K 11/161
USPC ................. 181/223, 233; 138/40, 42, 44
See application file for complete search history.

(56) References Cited

U.S. PATENT DOCUMENTS

| | | | |
|---|---|---|---|
| 825,010 A | 7/1906 | Snow | |
| 1,914,072 A * | 6/1933 | Boylston | F16L 55/02718 181/239 |
| 3,665,965 A * | 5/1972 | Baumann | F16L 55/04 138/42 |
| 4,050,479 A * | 9/1977 | Baumann | F16K 47/08 137/625.28 |
| 4,375,841 A * | 3/1983 | Vielbig | F16L 55/02709 181/230 |
| 4,530,375 A * | 7/1985 | Bey | F16K 5/10 137/614.17 |
| 4,751,980 A | 6/1988 | DeVane | |
| 5,327,941 A * | 7/1994 | Bitsakis | B01F 5/0682 138/42 |
| 5,495,872 A * | 3/1996 | Gallagher | F15D 1/025 138/40 |

(Continued)

FOREIGN PATENT DOCUMENTS

| | | |
|---|---|---|
| GB | 1512072 | 5/1978 |
| WO | 2009130652 | 10/2009 |

OTHER PUBLICATIONS

Emerson, "Installation Guide," Type FL, Oct. 2014, 10 pages.

(Continued)

*Primary Examiner* — Jeremy Luks
(74) *Attorney, Agent, or Firm* — Hanley, Flight & Zimmerman, LLC

(57) ABSTRACT

Noise attenuation apparatus for fluid devices are disclosed herein. A noise attenuation apparatus includes a first plate having a plurality of first openings to reduce noise generated by a fluid flowing through a fluid device and a second plate having a plurality of second openings to reduce noise generated by the fluid. The second plate directly engages the first plate, and the first openings to at least partially align with the second openings when the first plate is in direct engagement with the second plate to define a flow passageway of the noise attenuation apparatus.

16 Claims, 5 Drawing Sheets

(56) References Cited

U.S. PATENT DOCUMENTS

| | | | |
|---|---|---|---|
| 6,807,986 B2* | 10/2004 | Boger | F16K 47/08 138/44 |
| 7,325,474 B2 | 2/2008 | Yoshimura et al. | |
| 8,167,084 B1 | 5/2012 | Moore | |
| 8,307,943 B2* | 11/2012 | Klasing | F02K 3/075 138/39 |
| 8,307,947 B2 | 11/2012 | Büssow | |
| 8,523,141 B2* | 9/2013 | Elliott | F16K 47/08 251/127 |
| D720,670 S | 1/2015 | Maholick et al. | |
| 8,931,591 B2 | 1/2015 | Fagerlund et al. | |
| 9,534,725 B1 | 1/2017 | Tecson et al. | |
| 2014/0069737 A1* | 3/2014 | May | F01N 1/00 181/207 |
| 2016/0018178 A1 | 1/2016 | Johansen | |

OTHER PUBLICATIONS

Emerson, "Type FL Pressure Reducing Regulators," Jul. 2015, Bulletin 71.2:FL, 32 pages.

Emerson, "Pressure Regulators," Type FL, 2014, 20 pages.

United States Patent and Trademark Office, "Non-Final Office Action", issued in connection with U.S. Appl. No. 14/996,990, dated Jul. 21, 2016 (19 pages).

United States Patent and Trademark Office, "Notice of Allowance", issued in connection with U.S. Appl. No. 14/996,990, dated Sep. 15, 2016 (12 pages).

Patent Cooperation Treaty, "International Search Report," issued in connection with International Patent Application No. PCT/US2017/013369, dated Apr. 13, 2017, 5 pages.

Patent Cooperation Treaty, "Written Opinion," issued in connection with International Patent Application No. PCT/US2017/013369, dated Apr. 13, 2017, 10 pages.

\* cited by examiner

NOISE ATTENUATION APPARATUS FOR FLUID DEVICES

CROSS-REFERENCE TO RELATED APPLICATIONS

This patent relates to subject matter disclosed in U.S. patent application Ser. No. 14/996,990, entitled "NOISE-ATTENUATION APPARATUS FOR PRESSURE REGULATORS", and filed on Jan. 15, 2016, which is incorporated herein by reference in its entirety.

FIELD OF THE DISCLOSURE

The present disclosure relates generally to noise attenuators and, more particularly, to noise attenuation apparatus for fluid devices.

BACKGROUND

Fluid devices are commonly distributed throughout process control systems to control flow rates and/or pressures of various fluids (e.g., liquids, gasses, etc.) of a process system. In particular, a fluid device such as a fluid regulator may be used to reduce a pressure of a fluid and regulate the pressure to a substantially constant value. Specifically, a fluid regulator has an inlet that typically receives a fluid at a relatively high pressure and provides a relatively lower pressure at an outlet. The inlet pressure is reduced to a lower outlet pressure by restricting flow through an orifice to match a fluctuating downstream demand. In process control applications, such as power generation or petroleum refining applications, process conditions may produce unacceptable levels of aerodynamic noise. For example, elevated pressure drops and/or relatively high flow rates can produce unacceptable noise levels (e.g., aerodynamic noise of approximately 85dBA (A-weighted decibels) measured 1 meter downstream and 1 meter off a pipeline having a control valve).

SUMMARY

In one example, a noise attenuation apparatus includes a first plate having a plurality of first openings to reduce noise generated by a fluid flowing through a fluid device and a second plate having a plurality of second openings to reduce noise generated by the fluid. The second plate directly engages the first plate, and the first openings to at least partially align with the second openings when the first plate is in direct engagement with the second plate to define a flow passageway of the noise attenuation apparatus.

In another example, a noise attenuation apparatus includes a plurality of plates in a stacked orientation to define a first plate assembly. Each of the plates of the first plate assembly includes a body defining a first face and a second face opposite the first face to define a thickness of the plate, a plurality of openings extending between the first face and the second face, a first plurality of apertures formed through the second plate, where the first plurality of apertures are positioned between a peripheral edge of the plate and a central axis of the plate, and a second plurality of apertures formed through the plate, where the second apertures being positioned between the first plurality of apertures and the central axis.

In another example, a noise attenuation apparatus includes first means for suppressing noise of a fluid and second means for suppressing noise of the fluid coupled to the first means for suppressing noise. The first and second means for suppressing noise define a first noise abatement assembly when the first and second means for suppressing noise are coupled together. Each of the first and second means for suppressing noise include means for splitting a stream of fluid into a plurality of smaller streams of fluid to reduce noise generated by a fluid flowing through a fluid device, where the means for splitting the stream of fluid is formed between a central axis and a peripheral edge; means for attaching the first means for suppressing noise and the second means for suppressing noise to define the first noise abatement assembly; and means for coupling the first noise abatement assembly to a second noise abatement assembly spaced from the first noise abatement assembly.

DETAILED DESCRIPTION

Figure 1:
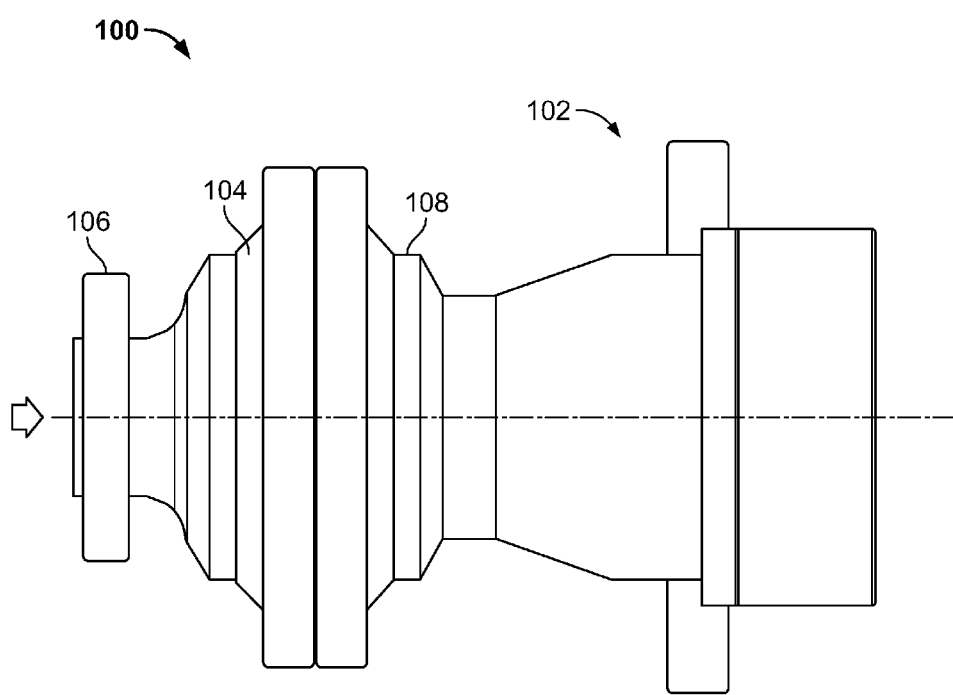
FIG. 1 is an example fluid device in fluid communication with a noise attenuation apparatus in accordance with the teachings of this disclosure.

Fluid devices often employ valve noise suppression or reduction devices to reduce an amount of energy in a fluid flow stream that may otherwise generate noise and/or shift a frequency of generated noise to levels beyond an audible range. Some noise suppression devices may include internal fluid structures (e.g., plates, cages, springs, etc.) to dissipate energy of a fluid flow to reduce noise. For example, some known noise suppression devices include a cage to house a plurality of springs (e.g., hundreds or thousands of springs) that substantially reduce audible noise levels. Although the springs are effective at reducing noise, the springs significantly increase manufacturing costs and complexity. In other known examples, noise suppression devices may include a series of spaced apart plates and/or discs that define a plurality of small fluid passageways to incrementally reduce pressure and/or fluid flow velocity along a flow path of the fluid device. However, such discs often have a thickness requiring machining instead of stamping, laser cutting and/or other non-machining manufacturing techniques, which increase manufacturing costs and complexity. In some known examples, in which discs or plates employ a smaller thickness, spacers or rods extend through a center of each of the plates. As a result, the rods may provide less support to peripheral portions or edges of the plates, which may cause the unsupported peripheral portions of the plates to bend or become damaged by fluid acting on the peripheral portions, thereby reducing an amount of noise attenuation provided by the plates.

The example noise attenuation apparatus disclosed herein may be positioned in fluid communication with a fluid passageway of a fluid device to reduce noise generated by a relatively high velocity fluid flow and/or a fluid flow that undergoes a significant pressure drop across the fluid device. An example noise attenuation apparatus disclosed herein may employ a noise suppression assembly having a plurality stacked plates. In particular, the stacked plates of an example noise suppression assembly may provide performance and/or strength characteristics that behave similar to a unitary plate having dimensions (e.g., a thickness) substantially similar to the dimensions (e.g., a thickness) of the stacked plates. The stacked plates may be formed via stamping, molding, laser cutting and/or any other manufacturing technique(s) that does not require machining. In this manner, the noise suppression assembly significantly reduces manufacturing costs and/or complexity. For example, the plates disclosed herein are lower cost compared to a plate that requires machining.

In some examples, a plurality of stacked plates disclosed herein may include a first noise attenuation or suppression body or plate having a plurality of first openings to dissipate energy of a fluid flow, and a second noise attenuation or suppression body or plate having a plurality of second openings to dissipate energy of the fluid flow. In some examples, the first plate directly engages the second plate such that the first openings of the first plate at least partially align with the second openings of the second plate when the first plate is in direct engagement with the second plate to define a flow passageway of the stacked plates between a first side of the first plate and a second side of the second plate opposite the first plate. In some examples, the plurality of stacked plates may be coupled or held together via a first fastener. In some examples, the first plate may include a first aperture that is to align with a second aperture of the second plate to receive the first fastener. In some examples, the first fastener may include a fluid flow passageway to enable fluid flow therethrough.

An example noise attenuation apparatus disclosed herein may include a first noise suppression assembly coupled to a second noise suppression assembly via a retainer. In some such examples, the first plate may include a third aperture and the second plate may include a fourth aperture that may align to receive a second fastener or rod of the retainer (e.g., an elongated fastener or bolt). In some such examples, the third aperture may be positioned between a central axis of the first plate and a peripheral edge of the first plate, and the fourth aperture may be positioned between a central axis of the second plate and a peripheral edge of the second plate. In some such examples, the first aperture may be positioned between the third aperture and the central axis of the first plate, and the second aperture may be positioned between the fourth aperture and the central axis of the second plate.

The first and second fasteners disclosed herein may increase structural support for the noise suppression assembly. The first fastener may prevent a body portion (e.g., a central body portion) of the stacked plates between a peripheral edge and a central axis of the plate from bending and/or deforming when pressure is applied to the body of the plate. In addition, because the example second fastener disclosed herein may be positioned along the peripheral portions of the respective noise suppression assemblies, the second fastener may deter and/or prevent the peripheral portions of the stacked plates from bending and/or deforming away from a wall of the fluid passageway when pressure is applied to the peripheral portions of the stacked plates.

FIG. 1 is an example fluid regulator assembly 100 in fluid communication with a noise attenuation apparatus 102 constructed in accordance with the teachings of this disclosure. The regulator assembly 100 of the illustrated example processes a fluid (e.g., natural gas, air, propane, nitrogen, hydrogen, carbon dioxide, etc.) through a passageway (e.g., an axial passageway) of a regulator 104 between a regulator inlet 106 and a regulator outlet 108. The regulator inlet 106 of the illustrated example is capable of receiving a relatively high pressure fluid (e.g., between approximately 1200 psi and 1800 psi) and reduces a pressure of the fluid at the regulator outlet 108 (e.g., to between approximately 10 psi and 1100 psi) based on a predetermined or preset setting. Due to a relatively large pressure drop of the fluid and/or relatively high velocity flow rate as the fluid flows between the regulator inlet 106 and the regulator outlet 108, the fluid may produce unacceptable noise levels (e.g., aerodynamic noise of approximately 85dBA (A-weighted decibels) measured 1 meter downstream and 1 meter off a pipeline having the fluid regulator assembly 100). To reduce noise levels of the fluid exiting the regulator 104 to acceptable levels (e.g., less than 85 decibels), the noise attenuation apparatus 102 of the illustrated example is in fluid communication (e.g., fluidly coupled) with the outlet 108 of the regulator 104. In some examples, the noise attenuation apparatus 102 of the illustrated example can reduce noise levels up to approximately 25 dBA.

Figure 2:
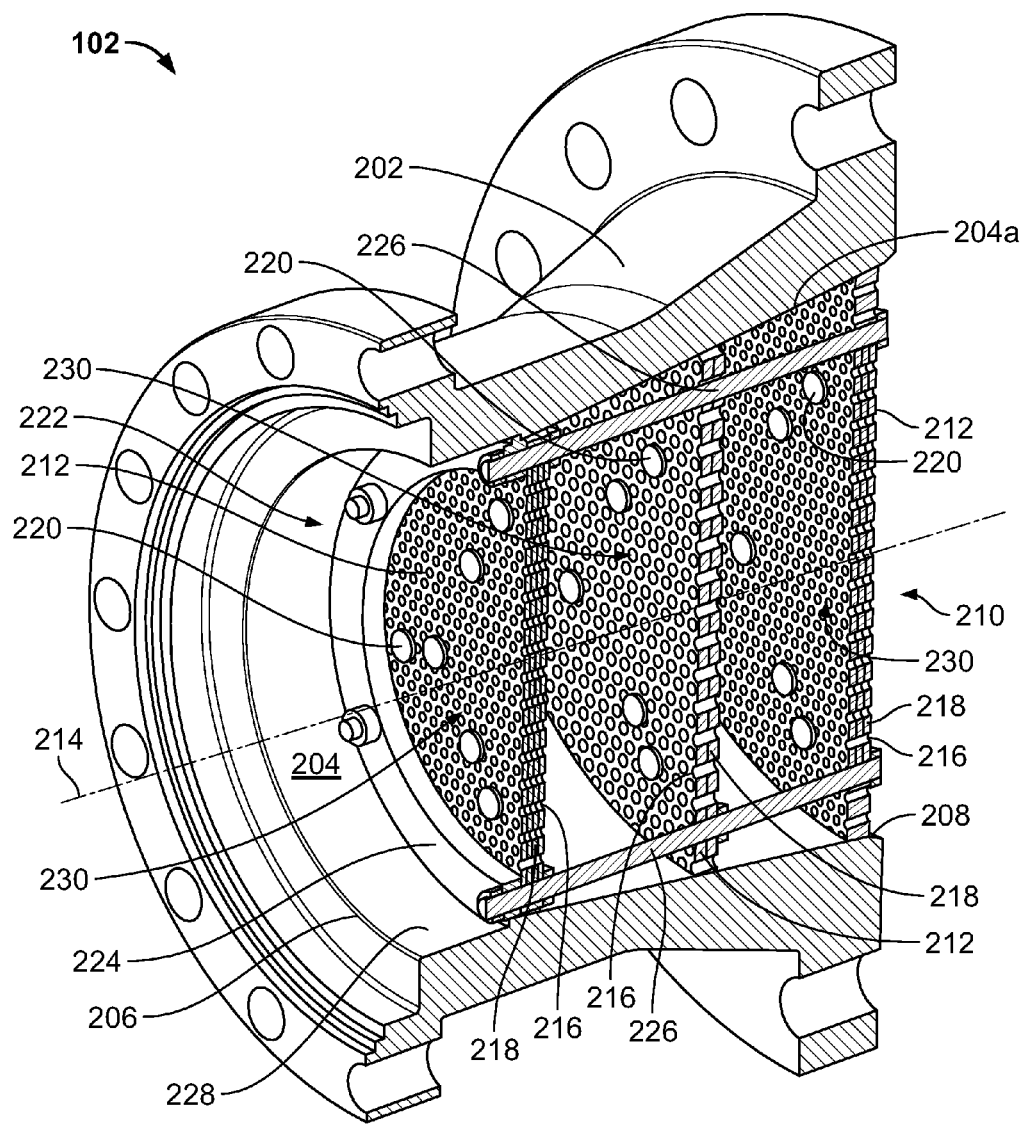
FIG. 2 is a perspective, cross-sectional view of the noise attenuation apparatus of FIG. 1.

FIG. 2 is a perspective, cross-sectional view of the noise attenuation apparatus 102 of FIG. 1. The noise attenuation apparatus 102 of the illustrated example includes a body 202 defining a fluid passageway 204 between an inlet 206 and an outlet 208. A cross-section or an opening of at least a portion 204a of the passageway 204 of the illustrated example gradually expands or increases between the inlet 206 and the outlet 208. In other words, at least the portion 204a of the fluid passageway 204 is angled or tapered between the inlet 206 and the outlet 208 to provide a diverging flow pathway to dissipate energy and/or reduce noise produced by fluid flowing through the fluid passageway 204. However, in some examples, the cross-section or an opening of the fluid passageway 204 of the noise attenuation apparatus 102 may not be tapered or angled and may be substantially constant or linear (e.g., straight). In some examples, the inlet 206 of the noise attenuation apparatus 102 may define a portion (e.g., a valve seat) of the regulator 104 (FIG. 1) when the noise attenuation apparatus 102 is coupled to the regulator 104 (FIG. 1).

The noise attenuation apparatus 102 of the illustrated example includes a noise abatement assembly 210 positioned in the fluid passageway 204 (e.g., positioned between the inlet 206 and the outlet 208). The noise abatement assembly 210 of the illustrated example includes a plurality of noise suppression assemblies 212 spaced (e.g., fixed) along a longitudinal axis 214 (e.g., a central axis) of the fluid passageway 204. Each of the noise suppression assemblies 212 defines a plurality of passageways 216 (e.g., perforations or openings) that split, divide or segregate fluid flow from the regulator outlet 108 (FIG. 1) into multiple, smaller fluid streams to dissipate energy of the fluid as the fluid flows through the noise suppression assemblies 212 to reduce aerodynamic noise generated by fluid flow rates and/or pressure drops through the fluid regulator assembly 100 (FIG. 1). Each of the noise suppression assemblies 212 of the illustrated example includes a plurality of discs or plates 218 that are positioned or coupled in a stacked orientation via fasteners 220.

To couple the noise suppression assemblies 212, the example noise abatement assembly 210 of the illustrated example includes a retainer 222. The retainer 222 of the illustrated example includes a flange or ring 224 (e.g., an annular ring) and one or more fasteners 226 (e.g., elongated retention bars or bolts). The fasteners 226 of the illustrated example extend in a direction substantially parallel to the longitudinal axis 214 of the fluid passageway 204.

In operation, the noise attenuation apparatus 102 (e.g., the noise abatement assembly 210 and/or the diverging fluid passageway 204) dissipates energy of fluid to reduce noise produced by high energy fluid flowing through the noise attenuation apparatus 102. For example, as the fluid passes between the inlet 206 and the outlet 208 of the noise attenuation apparatus 102, the fluid impacts or flows through the passageways 216 of the noise suppression assemblies 212 and the gradually expanding fluid passageway 204, which work together to dissipate energy of the fluid to reduce noise. More specifically, the noise suppression assemblies 212 and/or the fluid passageway 204 iteratively reduce pressure and/or velocity of fluid flowing through the passageways 216 and the fluid passageway 204 to provide a staged reduction or dissipation of energy of fluid exiting the regulator 104 (FIG. 1).

During operation, the ring 224 and/or the fasteners 226 (or more generally the retainer 222) of the illustrated example support peripheral or outer edges of the stacked plates 218 of the noise suppression assemblies 212. Because the example fasteners 226 disclosed herein are positioned along the outer edges of the noise suppression assemblies 212, the fasteners 226 deter and/or prevent the outer edges from bending and/or deforming away from an inner wall 228 of the body 202 defining the fluid passageway 204 when pressure is applied to the outer edges of the plate 218 by fluid flowing within the fluid passageway 204.

Additionally, during operation, the fasteners 220 support an inner area or portion 230 (e.g., an inner or central area) of the respective stacked plates 218 that are not supported by the retainer 222 (e.g., the fasteners 226 and/or the ring 224) between the peripheral edges of the stacked plates 218 and a center of the stacked plates 218 (e.g., a center coaxially aligned with the longitudinal axis 214). Because the example fasteners 220 are positioned away from the peripheral edges of the stacked plates 218, the fasteners 220 deter and/or prevent the inner areas or portions 230 of the stacked plates 218 from bending, breaking and/or otherwise failing over time when pressure is applied to the inner portion 230 by fluid flowing within the fluid passageway 204. As described in greater detail below, the stacked plates 218 and the fasteners 220 significantly reduce manufacturing costs and/or complexity.

Figure 3:
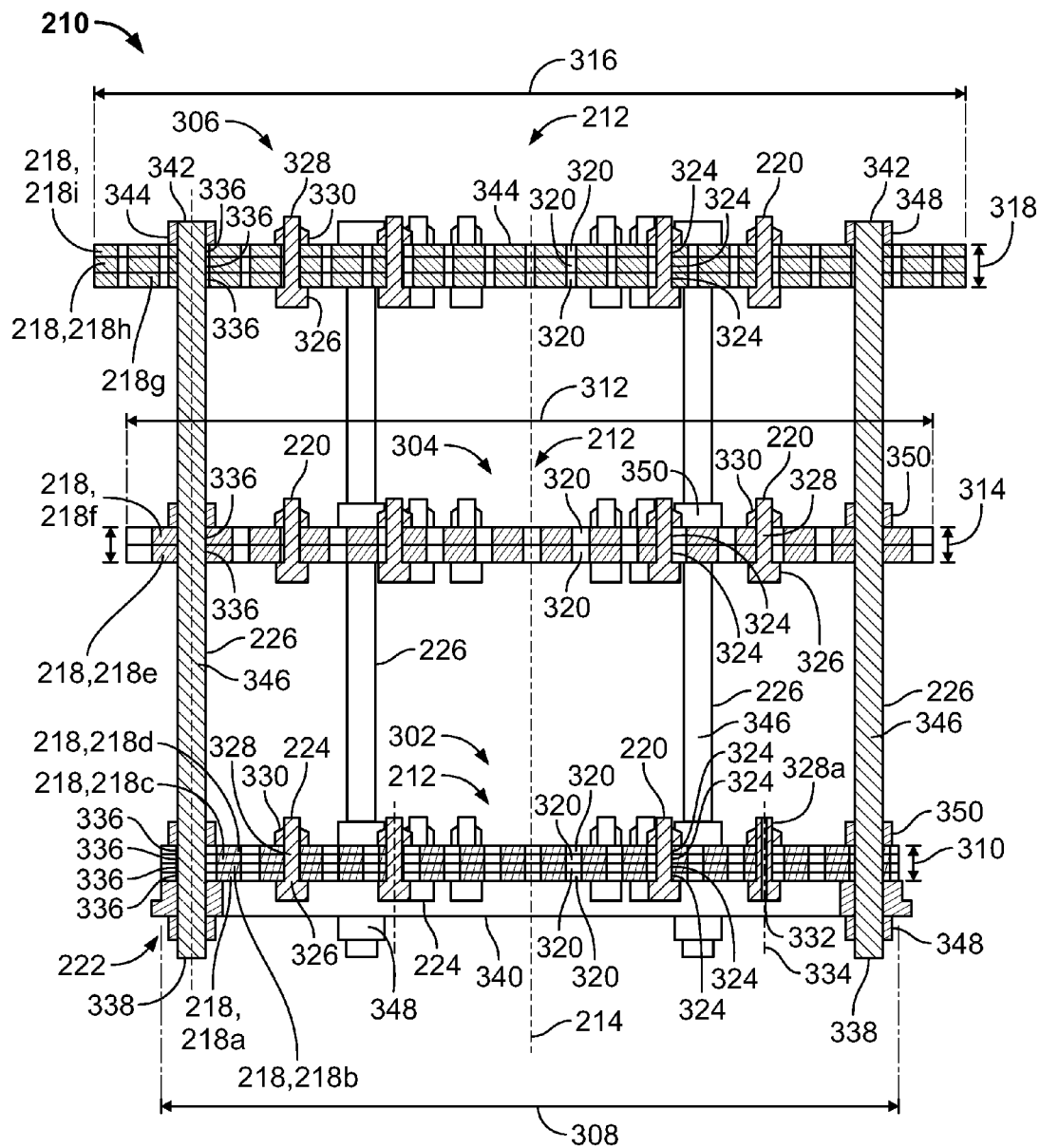
FIG. 3 is a cross-sectional view of an example noise abatement assembly of the example noise attenuation apparatus of FIGS. 1-2.

FIG. 3 is a side view of the example noise abatement assembly 210 of the example noise attenuation apparatus 102 of FIGS. 1 and 2. The noise suppression assemblies 212 of the illustrated example include a first noise suppression assembly 302, a second noise suppression assembly 304 and a third noise suppression assembly 306. The first noise suppression assembly 302 of the illustrated example is spaced from the second noise suppression assembly 304 and the third noise suppression assembly 306. Likewise, the second noise suppression assembly 304 is spaced from the third noise suppression assembly 306. In some examples, the noise abatement assembly 210 may include additional noise suppression assemblies. In some examples, the noise abatement assembly 210 may only include the first noise suppression assembly 302 and the second noise suppression assembly 304. In some examples, the noise abatement assembly 210 may only include the first noise suppression assembly 302.

As shown in FIG. 3, the stacked plates 218 of the first noise suppression assembly 302 provide a first dimension 308 (e.g., a diameter) and a second dimension 310 (e.g., a thickness). The stacked plates 218 of the first noise suppression assembly 302 of the illustrated example includes a first noise abatement body or plate 218a, a second noise abatement body or plate 218b, a third noise abatement body or plate 218c and a fourth noise abatement body or plate 218d that are positioned or held in a stacked orientation via the fasteners 220. However, in other examples, the stacked plates 218 of the first noise suppression assembly 302 may include more or less than four plates (e.g., may include only plates 218a-c). The stacked plates 218 of the second noise suppression assembly 304 of the illustrated example define a first dimension 312 (e.g., a diameter) and a second dimension 314 (e.g., a thickness). The stacked plates 218 of the second noise suppression assembly 304 of the illustrated example includes a first noise abatement body or plate 218e and a second noise abatement body or plate 218f positioned or coupled in the stacked orientation via the fasteners 220. However, in other examples, the second noise suppression assembly 304 may include only one plate or more than two plates. The stacked plates 218 of the third noise suppression assembly 306 provide a first dimension 316 (e.g., a diameter) and a second dimension 318 (e.g., a thickness). The stacked plates 218 of the third noise suppression assembly 306 of the illustrated example includes a first noise abatement body or plate 218g, a second noise abatement body or plate 218h and a third noise abatement body or plate 218i positioned or coupled in the stacked orientation via the fasteners 220. However, in other examples, the third noise suppression assembly 306 may include more or less than three plates (e.g., may include only the first plate 218g and the second plate 218h).

To accommodate the gradually diverging portion 204a of the fluid passageway 204 (FIG. 2) of the noise attenuation body 202, the first dimension 308 of the first noise suppression assembly 302 is different than (e.g., less than) the first dimension 312 of the second noise suppression assembly 304 and the first dimension 316 of the third noise suppression assembly 306. Likewise, the first dimension 308 of the second noise suppression assembly 304 is different than (e.g., less than) the first dimension 316 of the third noise suppression assembly 306. However, in some examples, the first dimensions 308, 312 and 316 of the respective noise suppression assemblies 302-306 are substantially the same (e.g., within a 10% manufacturing tolerance). In the illustrated example, the second dimensions 310, 314, and 318 of the respective noise suppression assemblies 302-306 are different. However, in some examples, the second dimensions 310, 314, and 318 of the respective noise suppression assemblies 302-306 are the same. In some examples, the second dimensions 310, 314, and 318 of the respective noise suppression assemblies 302-306 may be different from (e.g., greater than or less than) the other one of the second dimensions 310, 314, and 318 of the respective noise suppression assemblies 302-306. Thus, the noise suppression assemblies 302-306 are modular because more or fewer plates 218 may be stacked together to modify (e.g., increase or decrease) the second dimensions 310, 314 and 318 of the respective noise suppression assemblies 302-306 during, for example, manufacturing or assembly of the noise abatement assembly 210.

Each of the plates 218 of the illustrated example includes a plurality of openings 320 (e.g., perforations or openings) that define the plurality of passageways 216 of the respective noise suppression assemblies 212. More specifically, the openings 320 at least partially align to provide the passageways 216 to split or divide the fluid flow from the regulator outlet 108 into smaller fluid streams as the fluid flows through the stacked plates 218. For example, in some instances, an axis of a first opening 320 of the first plate 218a may coaxially align with a first opening 320 of the second plate 218b. In some instances, the axis of the first opening 320 of the first plate 218a may be offset relative to the axis of the first opening 320 of the second plate 218b, but the first openings 320 provide or define the passageway 216 to enable fluid flow therethrough.

In the illustrated example, the openings 320 of the first plate 218a at least partially align with respective ones of the openings 320 of the second plate 218b, the third plate 218c and/or the fourth plate 218d of the first noise suppression assembly 302. Similarly, the openings 320 of the first plate 218e at least partially align with respective ones of the openings 320 of the second plate 218f of the second noise suppression assembly 304. Likewise, the openings 320 of the first plate 218g at least partially align with respective ones of the openings 320 of the second plate 218h and/or the third plate 218i. In some examples, the openings 320 of the stacked plates 218a-d of the first noise suppression assembly 302 may align or may not align with the respective openings 320 of the stacked plates 218e-f of the second noise suppression assembly 304 and/or the openings 320 of the stacked plates 218g-i of the third noise suppression assembly 306 so that the passageways 216 (e.g., of the noise suppression assemblies 212) provide a substantially straight flow pathway and/or a tortuous flow path.

To receive the fasteners 220, the plates 218 (e.g., the plates 218a-i) of the illustrated example include a first plurality of apertures 324. Although the first apertures 324 of the respective plates 218a-i align, the first apertures 324 of the stacked plates 218a-d of the first noise suppression assembly 302 may not align (e.g., axially align) with the first apertures 324 of the stacked plates 218e-f of the second noise suppression assembly 304 and/or the first apertures 324 of the stacked plates 218g-i of the third noise suppression assembly 306. However, in some examples, the first apertures 324 of the stacked plates 218a-i of the illustrated example may be aligned (e.g., axially aligned or vertically aligned in the orientation of FIG. 3). The fasteners 220 of the illustrated example include a head 326, a shank or body 328 that is at least partially threaded, and a nut 330 that threadably couples to the body 328. When coupled to the plates 218, the body 328 of each of the fasteners 220 extends through a respective one of the first apertures 320 of the plates 218, and the plates 218 are positioned, stacked or otherwise clamped between the head 326 of the fasteners 220 and the nut 330.

In some examples, a body 328a of the fasteners 220 may be a hollow body defining a passage 332 that defines a portion of the fluid flow passageway 216 of the noise suppression assemblies 212. The passage 332 of the fastener 220 has a longitudinal axis 334 that is substantially parallel relative to the longitudinal axis 214 of the fluid passageway 204 when the noise abatement assembly 210 is coupled to the noise attenuation body 202. In some examples, all of the fasteners 220 of the stacked plates 218a-d, 218e-f and 218g-i include the passage 332. In some examples, some of the fasteners 220 include the passage 332 and some of the fasteners 220 do not include the passage 332.

To receive the fasteners 226 of the retainer 222 that couple the first suppression assembly 302, the second suppression assembly 304 and the third suppression assembly 306, each of the stacked plates 218a-d, 218e-f and 218g-i includes a second plurality of apertures 336. The second apertures 336 of the illustrated example are aligned (e.g., axially aligned or vertically aligned in the orientation of FIG. 3) to receive the respective fasteners 226 of the retainer 222. To couple the noise suppression assemblies 212, each of the fasteners 226 of the retainer 222 has a first end 338 adjacent a surface 340 of the ring 224 and a second end 342 adjacent a surface 344 of the third noise suppression assembly 306. Each of the fasteners 226 has an elongated body 346 that extends through the respective second apertures 336 of the plates 218a-i. The respective first ends 338 and second ends 342 of the fasteners 226 are threaded to receive nuts 348 to fasten or retain the plurality of noise suppression assemblies 212. In some examples, the retainer 222 may include spacers 350 (e.g., nuts) to maintain a fixed distance between the first noise suppression assembly 302, the second noise suppression assembly 304, and/or the third noise suppression assembly 306 relative to the longitudinal axis 214. Alternatively, in some examples, the elongated body 346 may have a stepped construction to define multiple shoulders to that maintain a fixed distance between the first noise suppression assembly 302, the second noise suppression assembly 304 and/or the third noise suppression assembly 306. For example, the elongated body 346 may include varying diameters (e.g., increasing and decreasing diameters) along a length of the elongated body 346 to define stepped surfaces. For example, the elongated body 346 may have a larger diameter in a middle or central portion between the ends 338 and 342 and the elongated body 346 may have a smaller diameter adjacent the ends 338 and 342 to provide stepped-down diameters towards the 338 and 342 ends. The stepped surfaces provided by the stepped-down surfaces maintain fix distances between the suppression assemblies 302-306 and/or reduce or eliminate use of the spacers 350.

Figure 4:
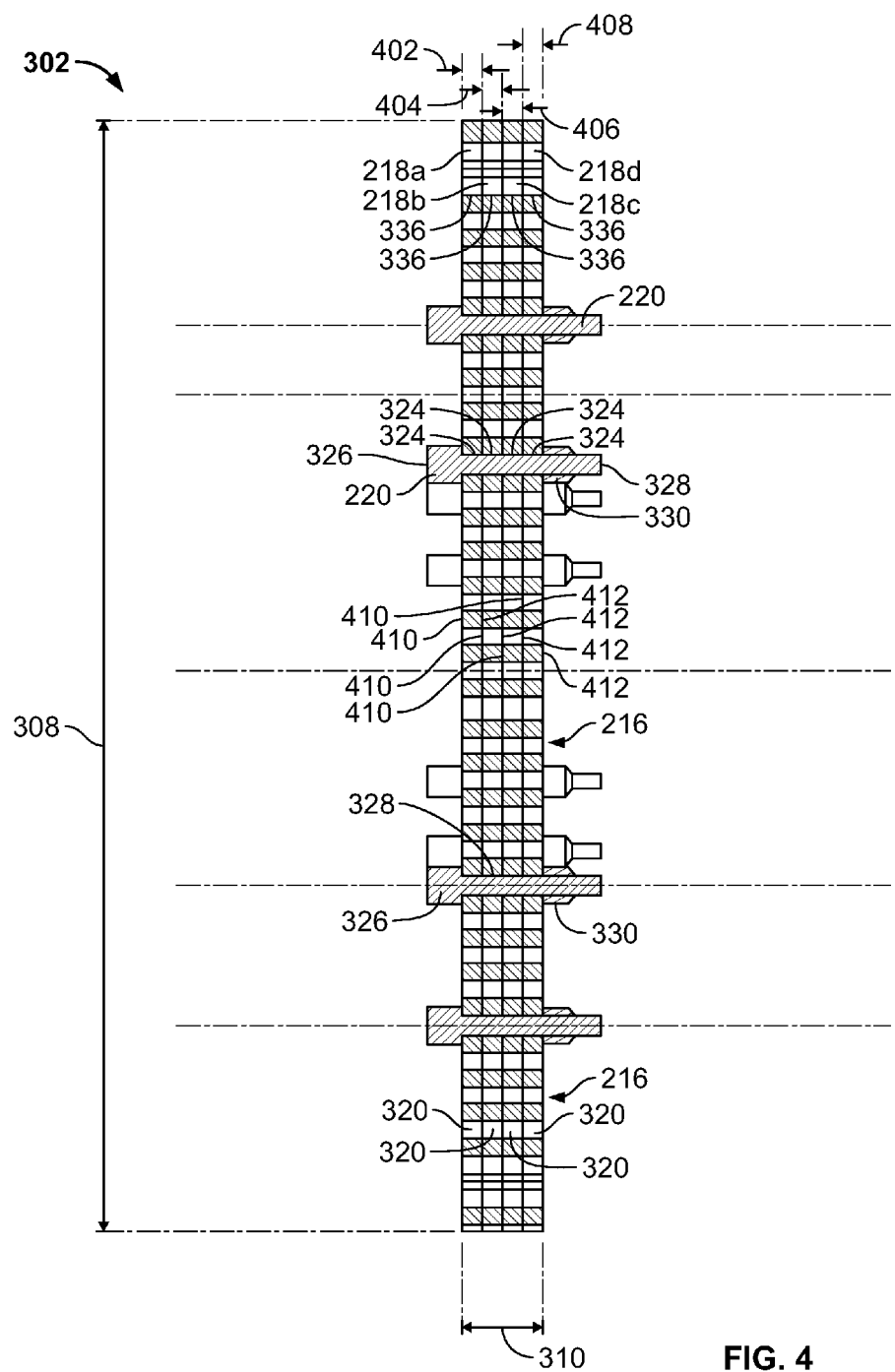
FIG. 4 is a side view of an example noise suppressing assembly of FIGS. 2-3.

FIG. 4 is a cross-sectional side view of the first noise suppressing assembly 302 of FIGS. 2-3. The first plate 218a of the first noise suppression assembly 302 has a first thickness 402, the second plate 218b has a second thickness 404, the third plate 218c has a third thickness 406 and the fourth plate 218d has a fourth thickness 408 that, when stacked together, define the second dimension 310 of the first noise suppression assembly 302. In particular, the second plate 218b is positioned adjacent or directly engaged with (e.g., stacked on top of) the first plate 218a. The third plate 218c is positioned adjacent or directly engaged with (e.g., stacked on top of) the second plate 218b and the fourth plate 218d is positioned adjacent or directly engaged with (e.g., stacked on top of) the third plate 218c.

Each of the plates 218a-d includes a first face or front side 410 and a second face or rear side 412 opposite the first face 410. The plurality of the openings 320, the first apertures 324 and the second apertures 336 extend through the first and second faces 410 and 412 of the respective plates 218a-d. Additionally, when the first plate 218a directly engages the second plate 218b, the openings 320 of the first plate 218a at least partially align with respective ones of the openings 320 of the second plate 218b. Similarly, the openings 320 of the first plate 218a and/or respective ones of the openings 320 of the second plate 218b at least partially align with respective ones of the openings 320 of the third plate 218c and/or respective ones of the openings 320 of the fourth plate 218d. In particular, the openings 320 of the first noise suppression assembly 302 of the illustrated example substantially align axially (e.g., are coincident) to provide substantially straight flow passageways 216 through the first noise suppression assembly 302. The openings 320 of the plates 218 (e.g., an axis of each opening 320) are substantially parallel relative to the longitudinal axis 214 of the fluid passageway 204 (FIG. 2). However, in other examples, (e.g., an axis of each of) the openings 320 of the first plate 218a, the second plate 218b, the third plate 218c and/or the fourth plate 218d may be at least partially offset relative to (e.g., an axis of each of) the openings 320 of the other ones of the first plate 218a, the second plate 218b, the third plate 218c and the fourth plate 218d to provide a tortuous flow path.

The first apertures 324 of the illustrated example have a diameter that is smaller than a diameter of the second apertures 336. However, in some examples, the diameter of the first apertures 324 may be larger or substantially similar relative to the diameter of the second apertures 336. Each of the first apertures 324 receives the body 328 of a respective fastener 220. Each head 326 of the fasteners 220 engages the first face 410 of the first plate 218a and each nut 330 engages the second face 412 of the fourth plate 218d.

Figure 5:
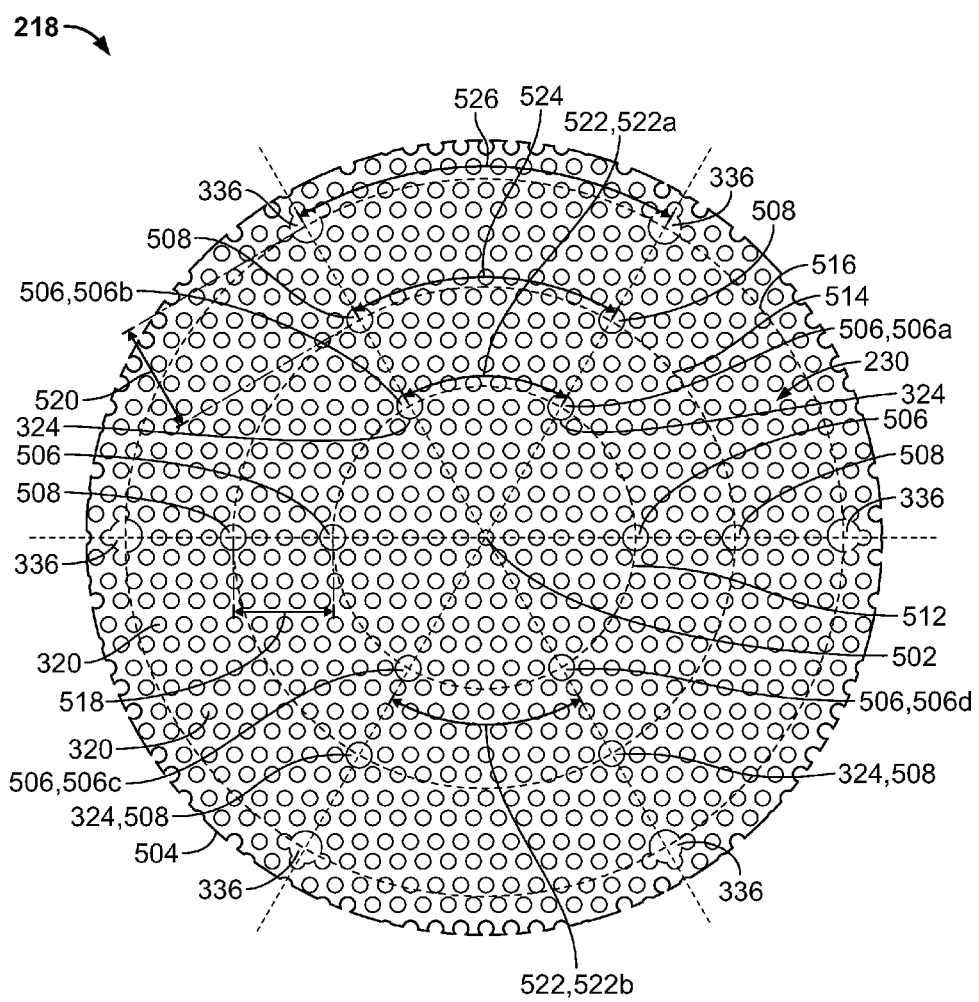
FIG. 5 is a front view of an example noise suppressing assembly of FIG. 4.

FIG. 5 is a front view of one of the plates 218 of the example noise suppression assemblies 212 of FIGS. 2-4. The plate 218 of the illustrated example has a circular shape. However, in other examples, the plate 218 may have a square shape, a rectangular shape, and/or any other shape. The plurality of openings 320 (e.g., perforations or openings) are radially spaced or positioned relative to a central axis 502 and/or are sized to increase (e.g., maximize) energy dissipation of fluid flowing through the openings 320, while increasing (e.g., maximizing) fluid flow through the openings 320. Each of the openings 320 of the illustrated example has a diameter that is substantially smaller than a diameter of the first apertures 324 and/or the second apertures 336. The openings 320 of the illustrated example include a circular profile. However, in other examples, the openings 320 may any other shape or profile (e.g., square, rectangular, triangular, etc.).

The first apertures 324 and the second apertures 336 of the illustrated example are provided or arranged in a pattern to significantly increase the strength of the plate 218 when provided in a stacked orientation with the other plates 218. More specifically, the first apertures 324 of the illustrated example are radially spaced relative to the central axis 502 of the plate 218. The central axis 502 of the illustrated example coaxially aligns with the longitudinal axis 214 of the fluid passageway 204 when the noise suppression assembly 212 is positioned in the fluid passageway 204. The first apertures 324 of the illustrated example are positioned between the second openings 336 and the central axis 502. The second apertures 336 are radially spaced relative to the central axis 502 and positioned between the first apertures 324 and a peripheral edge 504 of the plate 218.

The first apertures 324 of the illustrated example include a plurality of inner apertures 506 and a plurality of outer apertures 508. The inner apertures 506 of the illustrated example are positioned between the central axis 502 and the outer apertures 508, and the outer apertures 508 of the illustrated example are positioned between the second apertures 336 and the inner apertures 506. The inner apertures 506 of the illustrated example are positioned radially relative to the central axis 502 in a first ring pattern 512. The outer apertures 508 of the illustrated example are positioned radially relative to the central axis 502 in a second ring pattern 514. The second openings 336 of the illustrated example are positioned relative to the central axis 502 in a third ring pattern 516. The first ring pattern 512 of the illustrated example is spaced from the second ring pattern 514 by a distance 518. Similarly, the third ring pattern 516 of the illustrated example is spaced from the second ring pattern 514 by a distance 520. In some examples, the inner apertures 506, the outer apertures 508 and/or the second apertures 336 may be provided in a square pattern, a rectangular pattern, and/or any other pattern instead of the respective ring patterns 512-516.

Each of the inner apertures 506, the outer apertures 508 and the second apertures 336 of the illustrated example are spaced radially relative to the central axis 502. For example, the inner apertures 506 may be radially spaced relative to the central axis 502 by a first angle 522 (e.g., approximately between ten degrees and ninety degrees), the outer apertures 508 may be radially spaced relative to the central axis 502 by a second angle 524 (e.g., approximately between ten degrees and ninety degrees), and the second apertures 336 may be radially spaced relative to the central axis 502 by a third angle 526 (e.g., approximately between ten degrees and one-hundred eighty degrees).

In some examples, to more evenly distribute stress and/or strain in the plate 218 that result from the fluid flow acting on the plate 218, the first apertures 324 of the illustrated example are spaced (e.g., equidistantly) around the central portion 230 of the plate 218 and/or the second apertures 336 of the illustrated example are spaced (e.g., equidistantly) around the peripheral edge 504 of the plate 218. For example, in the illustrated example, the first angle 522, the second angle 524 and the third angle 526 are substantially equal (e.g., approximately 60 degrees). In the illustrated example, there are six inner apertures 506, six outer apertures 508 and six second apertures 336. In some examples, the inner apertures 506, the outer apertures 508 and/or the second apertures 336 may include less than six apertures or more than six apertures. In some examples, the inner apertures 506 may be more than six apertures and the outer apertures 508 may have less than six apertures. In some examples, the plate 218 may include only one inner aperture 506, only one outer aperture 508 or only one second aperture 336. In some examples, the plate 218 may only include the inner apertures 506 or may only include the outer apertures 508. In some examples, each of the first angles 522 separating respective ones of the inner apertures 506 may be different. In some examples, a first angle 522a between a first inner aperture 506a and a second inner aperture 506b may be different than a first angle 522b between a third inner aperture 506c and a fourth inner aperture 506d. In some examples, at least two of the second angles 524 separating the respective ones of the outer apertures 508 may be different. In some examples, at least two of the third angles 526 separating the respective ones of the second apertures 336 may be different.

The pattern of the inner apertures 506, the outer apertures 508 and/or the second apertures 336 may be configured to increase the strength of the plate 218. For example, a pattern of first apertures 324 (e.g., the inner apertures 506 and the outer apertures 508) and/or the second apertures 336 may depend on at least one of a diameter of the plate 218, a thickness of the plate 218, a thickness (e.g., the second dimensions 312, 314 or 318) of the noise attenuation assembly 212, a number of the openings 320, etc. The fasteners 220 of the noise suppression assemblies 212 significantly reduce stress imparted to the stacked plates 218 compared to stacked plates that do not employ the fasteners 220 (i.e., only employ a retainer or rod coupling the stacked plates).

From the foregoing, it will be appreciated that the above disclosed methods, apparatus and articles of manufacture significantly reduce manufacturing costs and complexity. In particular, the plates 218 of the illustrated example can be manufactured using stamping technique(s) and/or manufacturing process(es) that eliminate the need to machine the plurality of openings 320, the first apertures 324 and/or the second apertures 336. For example, a thickness of a plate that is too large (e.g., a value similar to the second dimensions 310, 314 or 318) may require machining the openings 320, the first apertures 324 and/or the second apertures 336, thereby increasing manufacturing time and complexity. In contrast, the example plates 218 disclosed herein are relatively thin (e.g., the thicknesses 402-408 of FIG. 4) to enable the openings 320, the first apertures 324 and/or the second apertures 336 to be formed via stamping, laser cutting, or other non-machining manufacturing techniques, thereby significantly decreasing manufacturing time, costs and complexity. Further, the plates 218 may be stacked to provide a desired thickness. For example, the plates 218 may be stacked to provide a noise suppression assembly 212 having a thickness (e.g., the second dimensions 310, 314 or 318) that is substantially similar to a thickness of a unitary plate. Additionally, the first fasteners 220 and/or the second fasteners 226 significantly increase the strength of the noise suppression assembly 212 (i.e., of the stacked plates 218) to enable the noise suppression assembly 212 to behave similar to a unitary plate having dimensions similar to the dimensions of the stacked plates 218. For example, the noise suppression assembly 212 may have strength characteristics that are similar to strength characteristics of a unitary plate having dimensions (e.g., a diameter and/or a thickness) similar to the dimensions (e.g. the dimensions 308, 312, 316 and/or the dimensions 310, 314, 318.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A noise attenuation apparatus comprising:
a first plate having a plurality of first openings to reduce noise generated by a fluid flowing through a fluid device, the first plate includes a first aperture and a second aperture, the second aperture being positioned between a peripheral edge and a central axis of the first plate, and the first aperture being positioned between the second aperture and the central axis of the first plate; and
a second plate having a plurality of second openings to reduce noise generated by the fluid, the second plate to directly engage the first plate, the first openings to at least partially align with the second openings when the first plate is in direct engagement with the second plate to define a flow passageway of the noise attenuation apparatus, the second plate includes a third aperture and a fourth aperture, the fourth aperture being positioned between a peripheral edge of the second plate and a central axis of the second plate,
wherein the first aperture of the first plate is to align with the third aperture of the second plate to receive a first fastener to couple the first plate and the second plate, and
wherein the second aperture of the first plate is to align with the fourth aperture of the second plate to receive a second fastener when the first plate is coupled to the second plate.

2. The apparatus of claim 1, wherein the third aperture is positioned between the fourth aperture and the central axis of the second plate.

3. The apparatus of claim 1, wherein the first plate and the second plate define a first noise suppression assembly when the first plate is coupled to the second plate, the second and fourth apertures to receive the second fastener to couple the first noise suppression assembly to a second noise suppression assembly spaced from the first noise suppression assembly.

4. A noise attenuation apparatus comprising:
a plurality of plates in a stacked orientation to define a first plate assembly, each of the plates of the first plate assembly including:
a body defining a first face and a second face opposite the first face to define a thickness of the plate;
a plurality of openings extending between the first face and the second face;
a first plurality of apertures formed through the plate, the first plurality of apertures positioned between a peripheral edge of the plate and a central axis of the plate, the first plurality of apertures to receive a first fastener to couple the plurality of plates defining the first plate assembly; and
a second plurality of apertures formed through the plate, the second plurality of apertures being positioned between the first plurality of apertures and the central axis, the second plurality of apertures to receive a second fastener to couple the plurality of plates of the first plate assembly to a second plate assembly spaced from the first plate assembly, wherein the first fastener does not engage a plate of the second plate assembly when the first plate assembly is coupled to the second plate assembly.

5. The apparatus of claim 4, wherein the first plurality of apertures is radially spaced adjacent the peripheral edge relative to the central axis.

6. The apparatus of claim 4, wherein the second plurality of apertures is formed in a pattern relative to the central axis.

7. The apparatus of claim 6, wherein the pattern is dependent on at least one of a diameter of the plate, a thickness of the plate or a number of the openings.

8. The apparatus of claim 4, wherein a diameter of the openings is substantially smaller than a diameter of the first plurality of apertures and the second plurality of apertures.

9. The apparatus of claim 4, wherein the first fastener includes a bolt and a nut.

10. The apparatus of claim 4, wherein the first fastener include a body having a pathway, the pathway having an axis that is substantially parallel relative to an axis of the openings.

11. The apparatus of claim 4, wherein the openings of a first plate align with openings of a second plate to define a fluid flow passageway of the first plate assembly when the first and second plates are in the stacked orientation.

12. A noise attenuation apparatus comprising:
first means for suppressing noise of a fluid; and
second means for suppressing noise of the fluid coupled to the first means for suppressing noise, the first and second means for suppressing noise defining a first noise abatement assembly when the first and second means for suppressing noise are coupled together, each of the first and second means for suppressing noise including:
means for splitting a stream of fluid into a plurality of smaller streams of fluid to reduce noise generated by a fluid flowing through a fluid device, the means for splitting the stream of fluid formed between a central axis and a peripheral edge;
means for attaching the first means for suppressing noise and the second means for suppressing noise to define the first noise abatement assembly; and
means for coupling the first noise abatement assembly to a second noise abatement assembly spaced from the first noise abatement assembly, the means for attaching being positioned between the means for coupling and the central axis and the means for coupling being positioned between the means for attaching and the peripheral edge.

13. The apparatus of claim 12, wherein the means for attaching include means for receiving a fastener, the means for receiving a fastener being positioned on a face of the first means for suppressing and the second means for suppressing in a predetermined pattern.

14. A noise attenuation apparatus comprising:
a first plate having first openings to reduce noise generated by a fluid flowing through a fluid device, the first plate having first apertures positioned between a central axis of the first plate and a peripheral edge of the first plate and second apertures positioned between the first apertures and the peripheral edge of the first plate, the first apertures to receive respective ones of first fasteners to couple the first plate to a second plate in a stacked configuration; and
a third plate having second openings to reduce noise generated by the fluid, the third plate having third apertures positioned between a central axis of the third plate and a peripheral edge of the third plate and fourth apertures positioned between the third apertures and the peripheral edge, the third apertures to receive respective ones of second fasteners to couple the third plate to a fourth plate in a stacked configuration, the second apertures of the first plate are to align with the fourth apertures of the third plate to receive respective ones of third fasteners to couple the first plate and the third plate, the first plate is to be spaced from the third plate.

15. The apparatus of claim 14, wherein the first apertures of the first plate are to align with fifth apertures of the second plate to receive the respective ones of the first fasteners when the first plate is coupled to the second plate, and the third apertures of the third plate are to align with sixth apertures of the fourth plate when the third plate is coupled to the fourth plate.

16. The apparatus of claim 14, wherein the first openings of the first plate are to at least partially align with third openings of the second plate to define a flow passageway of the noise attenuation apparatus when the first plate is in direct engagement with the second plate.

\* \* \* \* \*